United States Patent
DeVries et al.

(10) Patent No.: US 12,371,272 B2
(45) Date of Patent: Jul. 29, 2025

(54) MONITORING SYSTEM FOR CONVEYOR BELT ANCILLARY DEVICES

(71) Applicant: Flexible Steel Lacing Company, Downers Grove, IL (US)

(72) Inventors: Brett E. DeVries, Comstock Park, MI (US); David Adrian Moelker, Zeeland, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 193 days.

(21) Appl. No.: 18/130,688

(22) Filed: Apr. 4, 2023

(65) Prior Publication Data

US 2023/0312257 A1    Oct. 5, 2023

Related U.S. Application Data

(60) Provisional application No. 63/327,667, filed on Apr. 5, 2022.

(51) Int. Cl.
*B65G 43/02* (2006.01)
*B65G 43/06* (2006.01)

(52) U.S. Cl.
CPC .............. *B65G 43/02* (2013.01); *B65G 43/06* (2013.01); *B65G 2203/041* (2013.01); *B65G 2203/042* (2013.01); *B65G 2203/046* (2013.01)

(58) Field of Classification Search
CPC .................. B65G 17/326; B65G 43/02; B65G 2203/041; B65G 2203/046;
(Continued)

(56) References Cited

U.S. PATENT DOCUMENTS

| | | | |
|---|---|---|---|
| 4,587,852 A | 5/1986 | Butler | |
| 6,291,991 B1 * | 9/2001 | Schnell | B65G 43/02 |
| | | | 198/810.02 |

(Continued)

FOREIGN PATENT DOCUMENTS

| | | |
|---|---|---|
| EP | 0776839 B1 | 3/2001 |
| RU | 2753055 C1 | 8/2021 |

(Continued)

OTHER PUBLICATIONS

"A Novel Mining Conveyor Belt Modelling for UHF RFID Sensor based Health Monitoring", Tuz Zohra et al.; Oct. 27, 2021, 5 pages.

(Continued)

*Primary Examiner* — Mark A Deuble
(74) *Attorney, Agent, or Firm* — Fitch, Even, Tabin & Flannery LLP

(57) ABSTRACT

A system and apparatus are provided for monitoring a conveyor system. The system and apparatus may include one or more sensors or sensor modules associated with a conveyor belt. In one aspect, the apparatus includes a sensor connected to at least one of first and second plate members that are configured to be connected to one another on opposite surfaces of the conveyor belt. The sensor may be at least partially received in a recess formed in the conveyor belt such that the sensor resides in a protected pocket formed by at least one of the plate members and the recess in the conveyor belt. The system is configured to monitor ancillary devices of a conveyor system, such as a belt splice. The system may maintain a digital twin of an ancillary device so that a condition of the ancillary device may be monitored remotely.

29 Claims, 9 Drawing Sheets

(58) Field of Classification Search
CPC .. B65G 2203/042; B65G 15/30; B65G 45/12; F16G 3/08
USPC ..................................................... 198/844.2
See application file for complete search history.

(56) References Cited

U.S. PATENT DOCUMENTS

| | | | |
|---|---|---|---|
| 6,516,943 B2 * | 2/2003 | Engle | F16G 3/00 |
| | | | 198/844.2 |
| 6,988,610 B2 | 1/2006 | Fromme | |
| 7,066,314 B2 | 6/2006 | Whiteman | |
| 7,259,854 B2 | 8/2007 | Schnell | |
| 7,427,767 B2 | 9/2008 | Kemp | |
| 7,624,857 B2 | 12/2009 | Kuesel | |
| 7,673,740 B2 | 3/2010 | Kuesel | |
| 7,740,128 B2 | 6/2010 | Wallace | |
| 7,779,994 B1 * | 8/2010 | Travis | B65G 43/02 |
| | | | 198/810.01 |
| 7,810,634 B2 | 10/2010 | Wallace | |
| 7,894,934 B2 | 2/2011 | Wallace | |
| 7,928,922 B2 | 4/2011 | King | |
| 8,069,975 B2 | 12/2011 | Wallace | |
| 8,256,607 B2 | 9/2012 | Wallace | |
| 8,387,776 B2 | 3/2013 | Buchkremer | |
| 8,387,777 B2 * | 3/2013 | Tokhtuev | B65G 43/02 |
| | | | 198/810.04 |
| 8,657,105 B2 | 2/2014 | Twigger | |
| 8,662,290 B2 | 3/2014 | Twigger | |
| 9,316,285 B2 | 4/2016 | Demont | |
| 9,702,853 B2 | 7/2017 | Wallace | |
| 9,776,799 B2 * | 10/2017 | Ulchak | B65G 43/02 |
| 10,183,810 B2 | 1/2019 | Kaltenhäuser | |
| 10,801,902 B2 | 10/2020 | Kleczewski | |
| 10,836,585 B2 | 11/2020 | Devries | |
| 12,116,213 B2 * | 10/2024 | Airola | G01B 7/26 |
| 2004/0262132 A1 | 12/2004 | Pauley | |
| 2007/0222612 A1 | 9/2007 | Krisl | |
| 2009/0194391 A1 | 8/2009 | Lagneaux | |
| 2012/0012443 A1 | 1/2012 | Sakaguchi | |
| 2013/0206545 A1 | 8/2013 | Bogle | |
| 2019/0144209 A1 * | 5/2019 | Happe | B65G 43/02 |
| | | | 198/810.02 |
| 2019/0193946 A1 | 6/2019 | Devries | |

FOREIGN PATENT DOCUMENTS

| | | |
|---|---|---|
| WO | 2019153056 A1 | 8/2019 |
| WO | 2019175336 | 9/2019 |
| WO | 2019206505 A1 | 10/2019 |
| WO | 2020253905 A1 | 12/2020 |
| WO | 2021151577 A1 | 8/2021 |
| WO | 2021164828 A1 | 8/2021 |

OTHER PUBLICATIONS

Xerafy Roswell Datasheet, 2 pages, accessed online Feb. 23, 2022 at https://xerafy.com/wp-content/uploads/2022/08/Xerafy-ROSWELL-Datasheet.pdf.

Xerafy XS Dot Datasheet, 2 pages, accessed online Feb. 23, 2022 at https://xerafy.com/wp-content/uploads/2022/08/Xerafy-XS-Dot-Datasheet.pdf.

"Conveyor Diagnostics", Fenner Dunlop Conveyor Diagnostics; Aug. 28, 2019, 12 pages.

International Search Report and the Written Opinion for PCT/US2023/017369, mail date Jun. 21, 2023, 11 pages.

* cited by examiner

MONITORING SYSTEM FOR CONVEYOR BELT ANCILLARY DEVICES

CROSS-REFERENCE TO RELATED APPLICATION

This application claims benefit under 35 U.S.C. 119(e) to U.S. Provisional Application No. 63/327,667, filed Apr. 5, 2022, which is hereby incorporated by reference herein in its entirety.

FIELD OF THE INVENTION

NOM This disclosure relates to monitoring components of a conveyor system, and more particularly, to a monitoring system for conveyor belt ancillary devices.

BACKGROUND OF THE INVENTION

Conveyor systems are utilized to transport materials or objects from one location to another. One type of conveyor system is a conveyor belt system which may include a series of rollers and a conveyor belt arranged to travel thereover in a downstream belt travel direction. Rollers include both drive rollers or pulleys and idler rollers. Drive rollers are connected to a power source, such as a drive motor, which rotates the drive roller and the drive roller in turn acts upon the conveyor belt. For example, a conveyor system may include a head roller, a driven tail roller, idler rollers intermediate the head and tail rollers, and a conveyor belt forming a loop around the rollers. The conveyor belt has a carry or top run generally above the idler rollers and a lower or return run generally below the idler rollers. The driven tail roller engages the conveyor belt and drives the conveyor belt top run in a longitudinal, downstream belt travel direction. The idler rollers contact the bottom surface of the top run of the conveyor belt to support the weight of the material carried by the top surface of the top run of the conveyor belt. The idler rollers spin in response to the frictional engagement with the bottom surface of the top run of the conveyor belt and may include roller bearings to spin easily. Generally, material is deposited onto the upstream end of the top run of a belt and is discharged at the downstream end of the top run of the belt.

A splice of the conveyor belt may include mechanical fasteners secured to ends of the conveyor belt with loops of the fasteners being intermeshed and joined together by a hinge pin. The fasteners of the splice are typically metallic and include fastener plates, rivets, and/or staples. The fasteners can be damaged especially after a large number of cycles such that these components may not remain tightly clamped against the belt and/or may extend too far above the outer surface of the belt and create significant impacts with the scraper blades of a belt cleaner engaged with the belt with each rotation of the conveyor belt.

Another type of conveyor belt splice uses mechanical fasteners that do not form a hinge joint between belt ends but uses solid plate fasteners that join the ends of the conveyor belt together. Damage to the solid plate fastener may also cause the fastener to loosen from the belt such that, for example, a portion of the solid plate fastener extends upwardly from the outer surface of the conveyor belt and impacts the scraper blades engaged with the conveyor belt. Typically, these types of non-hinged fasteners are used with larger pulley sizes.

Furthermore, other components of a conveyor belt system may wear down over time or fail. For example, the scraper blades of a conveyor belt cleaner will wear down over time so that they no longer efficiently or effectively scrape material from the conveyor belt. In addition, the wear and failure of splices as described above can result in belt mistracking toward one side or the other of the rollers and causing uneven and increased wear on the scraper blades.

DETAILED DESCRIPTION

In accordance with one aspect of the present disclosure, a system and apparatus are provided for monitoring a conveyor system. The system and apparatus may include one or more sensors or sensor modules associated with a conveyor belt. The sensor modules associated with the conveyor belt may be in operable communication with and monitored by a multipurpose conveyor monitoring system, such as the various systems disclosed in U.S. Pat. No. 10,836,585, which is incorporated by reference herein in its entirety. Such a multipurpose conveyor monitoring system monitors other sensors associated with ancillary devices of the conveyor system, such as such as splices and splice fasteners, belt scrapers, idler rollers, trackers, and/or impact beds. The one or more sensors may be associated with the ancillary devices in a number of approaches, such as being integrated with the ancillary devices, mounted to or adjacent to the ancillary devices, mounted to support structure for the ancillary devices and/or mounted to frame members of the structure supporting the conveyor belt proximate the ancillary devices.

The ancillary devices may include portions with relatively short expected lifespans, such as intended wear or replaceable portions, and portions with relatively long expected lifespans, or permanent portions. Although referred to herein as being "permanent," the permanent portions may deteriorate over time and are capable of being replaced. The permanent portions have a longer predicted lifespan and are designed to outlast the "replaceable portions." For example, the replaceable portion of a belt cleaner may be wear portions such as the scraping blade of the belt cleaner and the permanent portion of the belt cleaner may be the housing or an elongated, rigid mounting structure, such as a base member or support pole, of the belt cleaner. As another example, the permanent portion is a portion of a frame of the conveyor system to which the ancillary devices are mounted.

Figure 1:
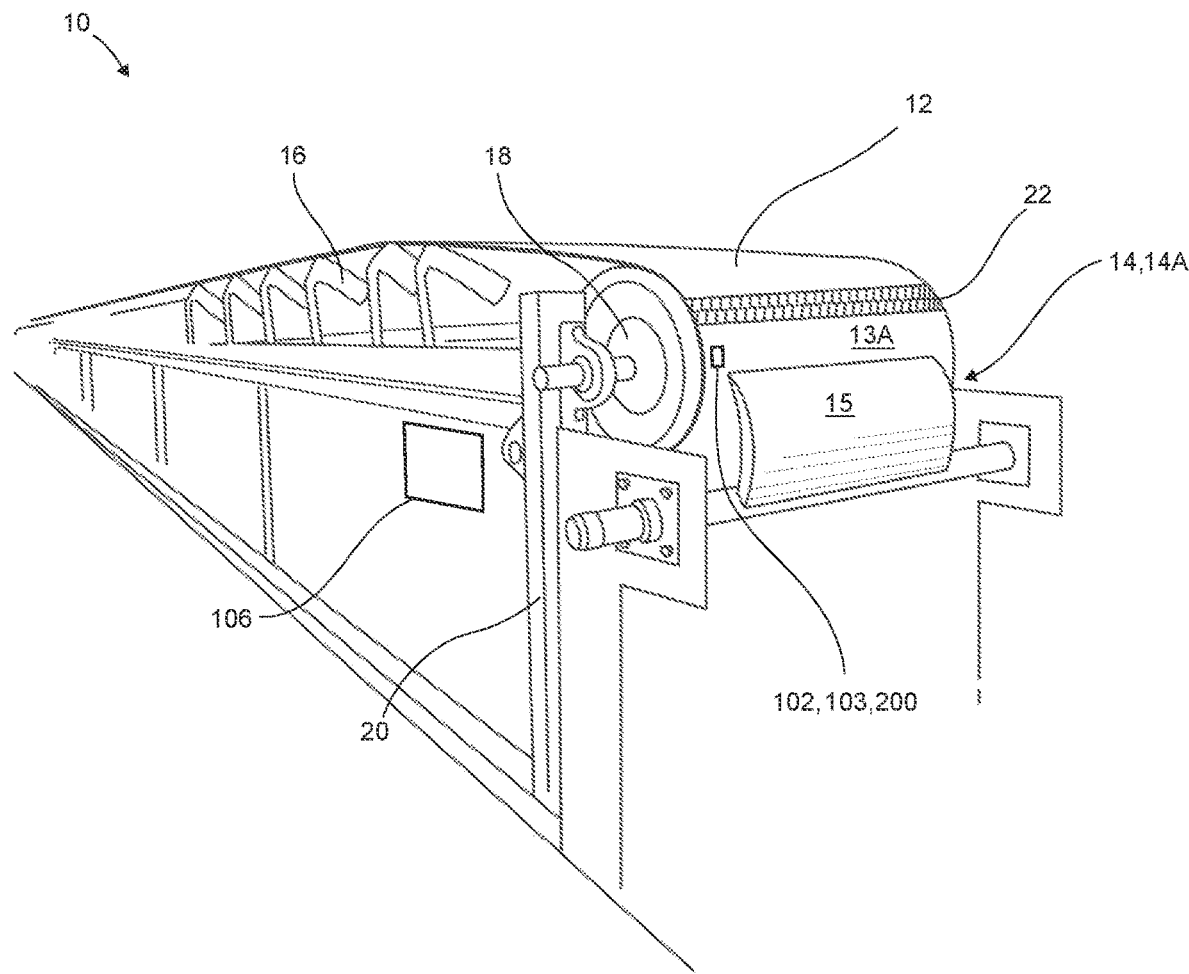
FIG. 1 is a perspective view of a conveyor system including a conveyor belt, a primary conveyor belt cleaner, and a sensor module associated with the conveyor belt configured to transmit signals regarding at least one property of the conveyor belt to a reader or receiver mounted adjacent to the conveyor belt.
Figure 2:
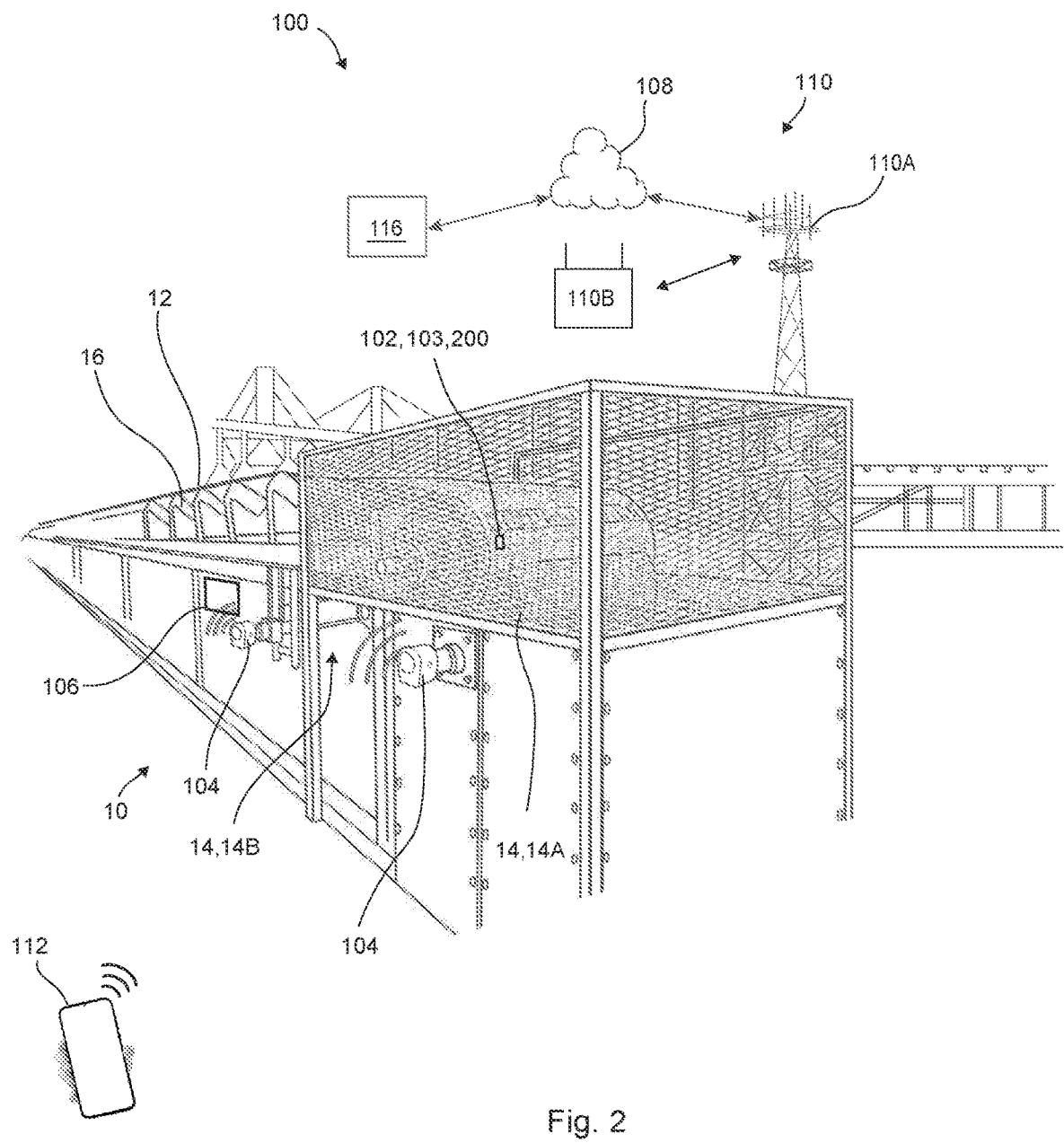
FIG. 2 is a perspective view of a conveyor belt system having a primary and a secondary conveyor belt cleaner each having a sensor module associated therewith configured to transmit signals regarding properties of the belt cleaners and the conveyor belt over a wireless network.

With reference to FIGS. 1 and 2, conveyor system 10 is provided that includes a conveyor belt 12 and a number of ancillary devices, such as belt cleaners 14, idler rollers 16, drive rollers 18, and splice 22. The conveyor system 10 may be a component of a larger conveyor system having multiple cooperating conveyor belts 12, may be multiple independent conveyor belts 12 at a common location, or multiple cooperating conveyor belts 12 at different locations, as some examples. The idler rollers 16 and drive rollers 18 of the system 10 are rotatably coupled to a stationary frame 20. The conveyor belt 12 is a continuous belt albeit possibly containing a belt splice or splices as described hereafter, extending around the idler rollers 16 and drive rollers 18 such that the conveyor belt 12 travels relative to the frame 20 along a path. The belt cleaners 14 each include one or more scraper blades 15 that are resiliently biased into engagement with the outer surface 13A of the belt 12. The belt cleaners 14 can include a pre-cleaner or primary belt cleaner 14A and a secondary belt cleaner 14B. The primary belt cleaner 14A is positioned at the head or drive roller 18 so as to remove material from the belt 12 and assist discharging the material from the conveyor belt 12. The secondary belt cleaner 14B is positioned along the return run of the conveyor belt 12 to provide additional cleaning of the conveyor belt 12 and limit "carry-back" of material. In other words, the secondary belt cleaner 14B ensures the material is discharged from the conveyor belt 12 near the head roller rather than dislodging at some indeterminant location between the head roller and tail roller of the conveyor belt 12.

In one form, a sensor or sensor module 102 may be secured to or integrated with a conveyor belt 12 for identifying, tracking, and monitoring data associated with the belt 12. The sensor module 102 in one form includes an RFID tag or chip 103, which may be a passive or active type RFID. The RFID chip 103 generally includes a substrate on which a memory and an antenna are mounted. The memory may be read only or may have both read and write capabilities. The antenna is configured for absorbing radio-frequency (RF) waves and for sending data to and receiving data from a RFID reader 106. An active RFID chip further includes a power supply, such as a battery, and onboard electronics, microprocessors, and input/output ports. The RFID reader 106 includes a radio frequency transmitter and receiver that can read information from, and write information to, the RFID chip 103. The RFID reader 106 may also include additional functionality, including wired or wireless communication functionality for communicating with other sensor modules (e.g., sensor module 104), computing devices such as a computer 114 or smartphone 112, or a gateway 110, such as cell tower 110A or router 110B, for communicating data to a cloud-based computing system, such as a control system 116, via a network 108 as depicted in FIG. 2. The network 108 may include one or more networks, such as a cellular phone network (e.g., 3G, 4G, 5G, etc.) and/or the internet.

In another form, instead of a stand-alone RFID reader 106, another of the sensor modules, such as sensor module 104, which may be the same as or similar to any of the sensor modules described in U.S. Pat. No. 10,836,585, may include an RFID reader 106 which is configured to detect an RFID chip 103 of a sensor module 102 as the sensor module 102 travels in proximity to the sensor module 104. RFID chips 103 can also be coupled to the replaceable portions of the ancillary devices, such as belt cleaners 14, idler rollers 16, and drive rollers 18. The RFID reader 106 thereby can detect the presence of the replaceable portion by detecting the RFID chip 103. Alternatively or additionally, the RFID reader 106 receives identifying information from the RFID chip 103. For example, the RFID reader 106 may detect the RFID chip 103 described above to identify the model number of a particular portion of the ancillary device. The control system 116 uses the identifying information to select the stored values to which the data from the RFID chip 103 are compared. In another form, a mobile device such as a smartphone 112 or tablet computer may be provided with an RFID reader 106. In this form, a user may use the mobile device to input additional information, comments, and photographed images of the monitored splice, section of a belt, or replaceable portion of the ancillary devices, which may then be transmitted to a database of the cloud computing system, such as control system 116, for tracking and monitoring the condition of the monitored splice, belt portion, or replaceable portion of an ancillary device remotely.

In some forms, the RFID reader 106 is always operable to detect RFID chips 103 for maintaining an accurate cycle count of how many times an object associated with the RFID chip 103, such as belt splice 22, has traveled past the RFID reader 106. In other forms, the RFID reader 106 may be operable to detect RFID chips 103 only at specific times, such as when a button on the RFID reader 106 or sensor module 104 is pressed, or at automated predetermined times. This reduces the amount of power used by the RFID reader 106 in comparison to if the RFID reader 106 were constantly scanning for signals from the RFID chip 103. In operation, a user can press the button when the new wear component or replaceable component, such as a belt splice 22, is installed so that the RFID reader 106 is powered and detects the RFID chip 103 associated therewith. The RFID reader 106 may also periodically operate to detect the RFID chip 103 so that the control system 116 can determine whether the replaceable component is still present.

The RFID chip 103 may be coupled to the conveyor belt 12 such that it travels along with the belt 12 during operation of the conveyor system 10. The RFID chip 103 may be coupled to the belt 12 near an object which is to be monitored, such as a belt splice 22 or other portion of the belt 10 to be associated therewith. The RFID chip 103 includes an identifier, such as a unique serial number, which can be used to develop historical data for operation of the conveyor belt system 10. For example, the identifier of the RFID chip 103 may be used to create a digital twin representative of the object with which the RFID chip 103 is associated, such as the belt splice 22. For example, a digital twin of belt splice 22 may be stored in a database of the control system 116, and include various information such as an RFID serial number, splice fastener type used in the splice 22, historical information such as number of cycles of the associated splice 22, installation date and age of the splice, installation date and age of the RFID chip 103 associated with the splice 22, information regarding the health or condition of the splice 22, such as images of the splice 22, user-entered comments, fault indications, actual inspection, repair, or replacement dates, as well as predictive information such as recommended inspection, repair, or replacement dates.

As shown in FIG. 1, the RFID chip 103 may be secured adjacent a lateral side edge of the belt 12, such that it is closer to an RFID reader 106 mounted adjacent to the belt 12 and less likely to encounter impacts from material on the belt 12 and from the belt cleaners 14A, 14B. When the RFID chip 103 comes in range of an RFID reader 106 positioned adjacent to the belt 12, the RFID reader 106 detects and identifies the RFID chip 103 and can transmit information obtained from the reading of the RFID chip 103 to a local and/or remote computing system, such as control system 116, which stores a running total of the instances that the RFID chip 103, and the splice 22, is detected by the RFID reader 106. Therefore, an RFID chip 103 may be mounted in or adjacent to each splice 22 of a conveyor belt 12 and the monitoring system 100 can uniquely track the operational age of each splice 22, such as the number of times each splice 22 has rotated or cycled around the conveyor system 10. If a splice 22 is repaired or replaced, the cycle total for that splice 22 can be reset in the monitoring system 100. This way, older splices 22 that are more likely to be damaged and worn than newer splices 22 can be monitored or inspected more frequently. For example, the control system 116 may communicate an alert, such as an e-mail, SMS message, or application notification, to a user, such as via a mobile device, in response to the number of cycles of the RFID chip 103 associated with belt splice 22 approaching a threshold, exceeding a threshold, and/or being a percentage of a predetermined number of cycles.

Figure 3A:
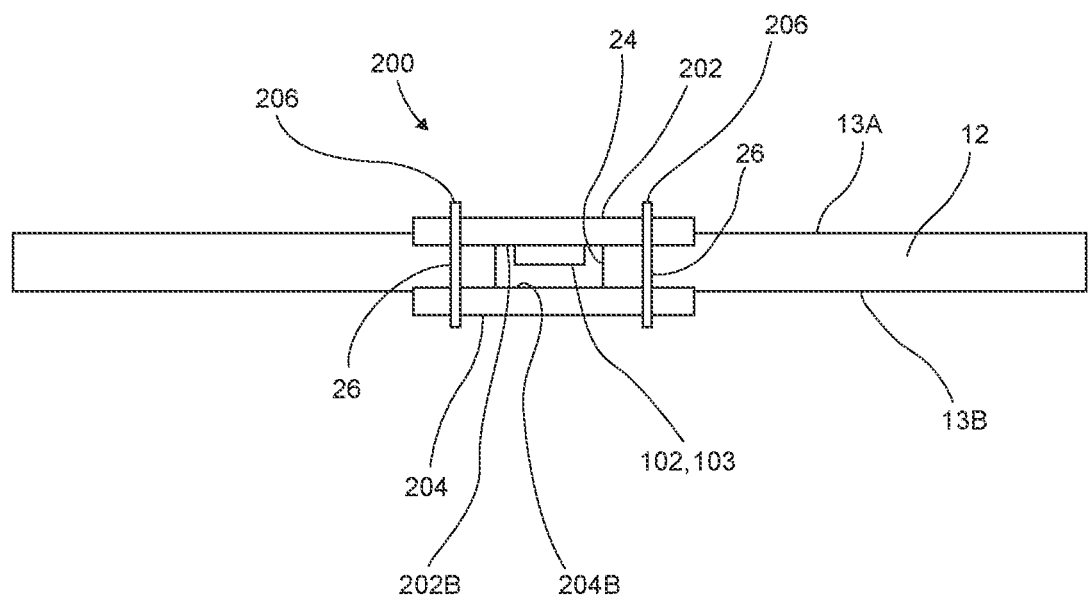
FIG. 3A is a side cross-sectional view of a schematic representation of a plate fastener assembly with a sensor module mounted thereto and the plate fastener assembly secured with bolts to a conveyor belt so that upper and lower fastener plates of the plate fastener assembly extend across an opening in the conveyor belt and the sensor module is disposed in the opening.
Figure 3B:
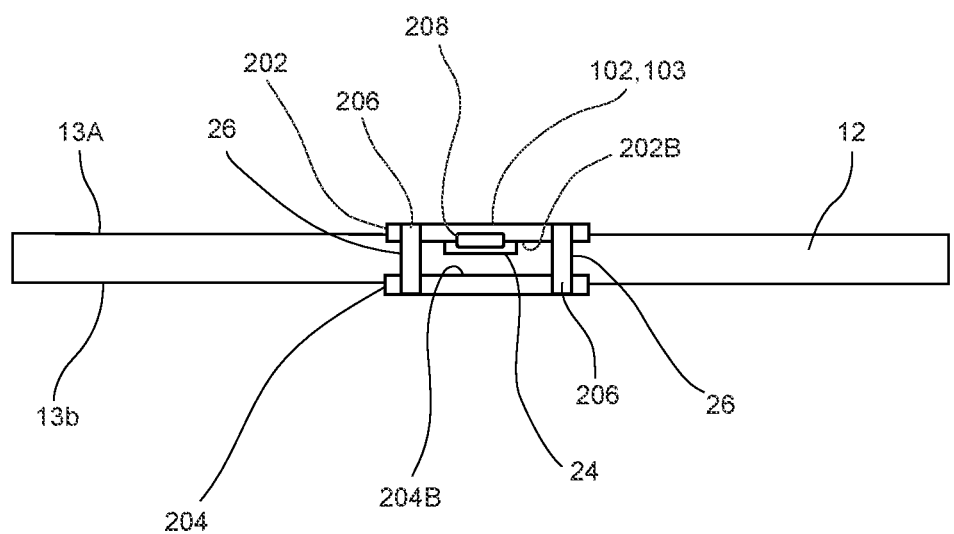
FIG. 3B is a side cross-sectional view of a schematic representation of a plate fastener assembly with a sensor module mounted within a recessed opening in an upper plate of the plate fastener assembly with the plate fastener assembly secured with bolts to a conveyor belt so that the upper fastener plate of the plate fastener assembly extends across a recessed opening in the conveyor belt and the sensor module is partially disposed in the recessed opening in the belt.

Referring now to FIG. 3A, a protective structure 200 for coupling a sensor module 102, such as RFID chip 103, to a conveyor belt 12 is shown in schematic form. In one form, the protective structure 200 is configured to couple the sensor module 102 to the belt 12 and protect the sensor module 102 from damage from the external environment such as impacts, bending forces, tensile and compressive forces, dust, debris, UV radiation, caustic substances and liquids. In one form, the protective structure 200 at least partially encloses the sensor module 102. For example, the protective structure 200 includes upper and lower plate members 202, 204 that are secured to opposite outer and inner surfaces 13A, 13B of the conveyor belt 12 and to each other via first and second fasteners 206, such as bolts that extend through apertures of the upper and lower plate members 202, 204 through openings formed in and the belt 12 therebetween. The sensor module 102 may be secured to one of the upper and lower plate members 202, 204. In one form, the sensor module 102 is coupled to an inner facing surface 202B of the upper plate member 202, such as via an adhesive. Alternatively, the sensor module 102 may be coupled to an inner facing surface 204B of the lower plate member 204, as shown with respect to bolt plate fastener 300 in FIG. 6. In another form shown in FIG. 3B, the sensor module 102 may be mounted to be at least partially or completely recessed in one of the plate members 202, 204, such as in a recess 208 formed in one of the inner facing surfaces 202B, 204B thereof that is sized and configured to receive at least a portion or the entirety of the sensor module 102 therein. For example, if the sensor module 102 is partially recessed in one of the plate members 202, 204 as shown in FIG. 3B, a portion of the sensor module 102 protrudes beyond the inner facing surface 202B, 204B of the corresponding plate member 202, 204. If the sensor module 102 is completely recessed in one of the plate members 202, 204, the sensor module 102 has an outer extent that is flush with or is positioned below the inner facing surface 202B, 204B of the corresponding plate member 202, 204.

An opening 24, such as a recessed opening or through-opening, may be formed in the belt 12 so that the sensor module 102 may be received at least partially therein when the protective structure 200 is fastened to the belt 12. The opening 24 may extend transversely with respect to the outer or inner surfaces 13A, 13B of the belt 12 with the upper and lower plate members 202, 204 fastened to the conveyor belt 12 adjacent the opening 24 such that one or both of the plate members 202, 204 cover over the opening 24. In this way, the sensor module 102 may be completely enclosed within a pocket and protected from the external environment, with the plate members 202, 204 above and below the sensor module 102, and the belt material extending about the opening 24 surrounding the sensor module 102 on all lateral sides thereof.

Where the opening 24 is a through opening, the plate members 202 and 204 are sized and fastened to the belt 24 so that they completely cover the through opening at the top and bottom thereof with the sensor module 102 inside the covered through opening, as shown in FIG. 3A. Where the opening 24 is a recessed opening that does not extend completely through the belt 12 and instead is formed in one of the outer or inner surfaces 13A, 13B of the belt 12, as shown in FIG. 3B, an upper plate member 202 may enclose the sensor module 102 within the recessed opening 24 such that the belt material extending about the recessed opening 24 encloses the sensor module 102 on a bottom side and on all lateral sides of the sensor module 102. The recessed opening 24 is sized such that the sensor module 102 is not compressed into the belt 12 or the belt material surrounding the recessed opening 24 by the plate member 202, 204 to which the sensor module 102 is attached. In each configuration, a protective material, such as epoxy or polyester resin, may be used to fill all or a portion of the recess 24 to further protect the sensor module 102. In other forms, the protective structure 200 could be omitted and the sensor module 102 inserted or embedded directly into a recess 24 in the belt 12 and covered with one or more of a plug, a sealant, an adhesive, and a protective coating such as epoxy or polyester resin.

To mount sensor module 102 and protective structure 200 to the conveyor belt 12 in order to associate the sensor module 102, such as RFID chip 103, to a portion of the belt 12, such as belt splice 22, two through openings 26 sized and configured to receive fasteners 206 are formed in the belt 12 in an area adjacent to the belt splice 22. The two through openings 26 should be located adjacent to the belt splice 22, such as upstream or downstream therefrom, and closer to the belt splice 22 than any other sensor module 102 or belt splice associated with the other sensor module 102. In this manner, another belt splice should not be located upstream or downstream of the through openings 26 between the through openings 26 and the belt splice 22. A third opening 24 sized and configured for receiving sensor module 102 without subjecting the sensor module 102 to compression against the belt 12 when the sensor module 102 is operatively connected thereto is formed centrally between and generally aligned with the two fastener through openings 26. The third opening 24 may either be a recessed opening or a through opening, as discussed above. If the sensor module 102 is entirely received within a recess 208 in the plate member 202, 204, or does not otherwise protrude from an inner facing surface of the plate member 202, 204 to which it is connected, the third opening 24 can be omitted. The plate members 202, 204 are then coupled to either side of the belt 12 with the third opening 24 between the plate members 202, 204 and with the sensor module 102 received in the third opening 24. A fastener 206 extends through each through opening 26 in the belt 12 and together a corresponding fastener, such as a nut, urge the plate members 202, 204 together with the belt sandwiched therebetween, such as described in more detail below.

Figure 4:
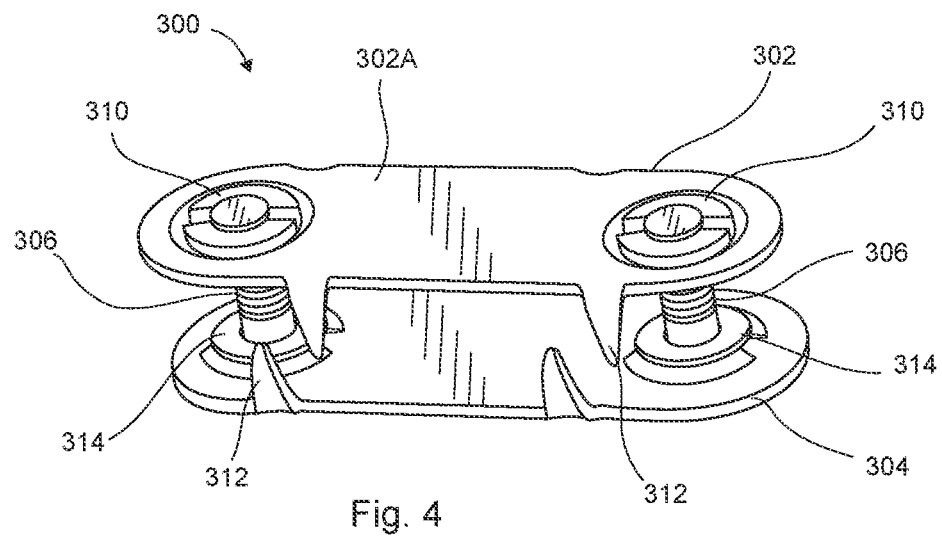
FIG. 4 is a perspective view of a representative plate fastener assembly in an assembled configuration without a conveyor belt.
Figure 5:
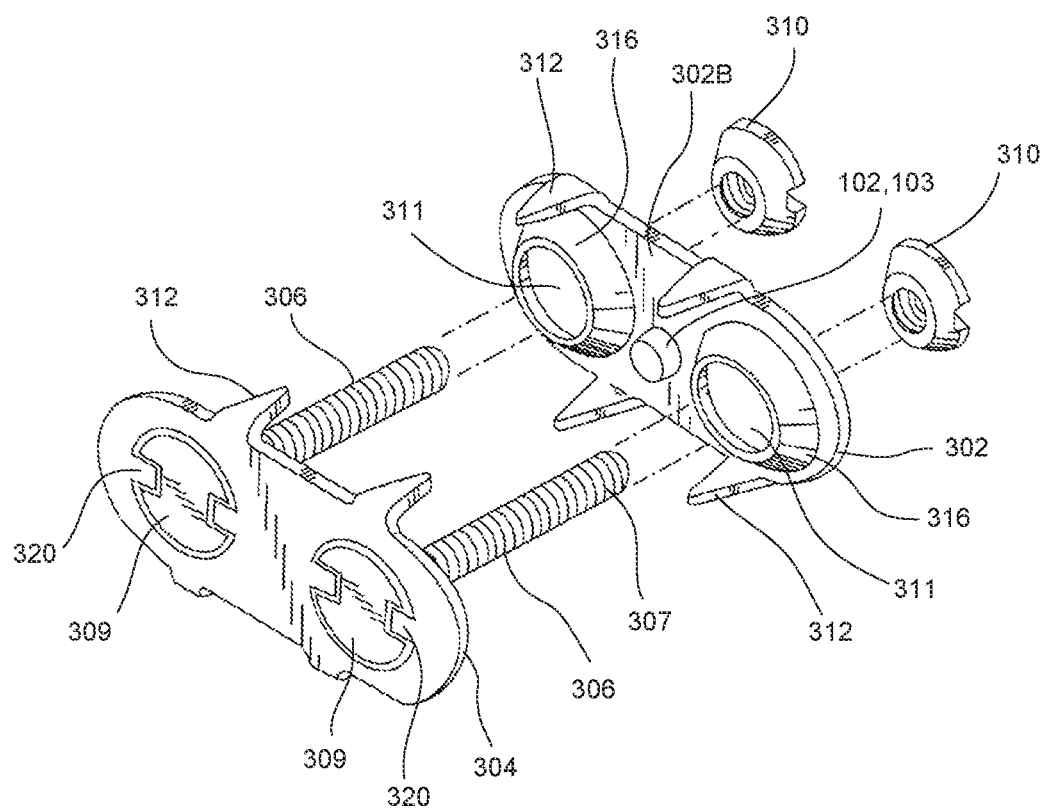
FIG. 5 is an exploded perspective view of the plate fastener assembly of FIG. 4 showing a lower plate, bolts extending through the lower plate towards an upper plate, a sensor module mounted to an inner facing surface of the upper plate, and nuts for being received on the threaded end portions of the bolts.
Figure 6:
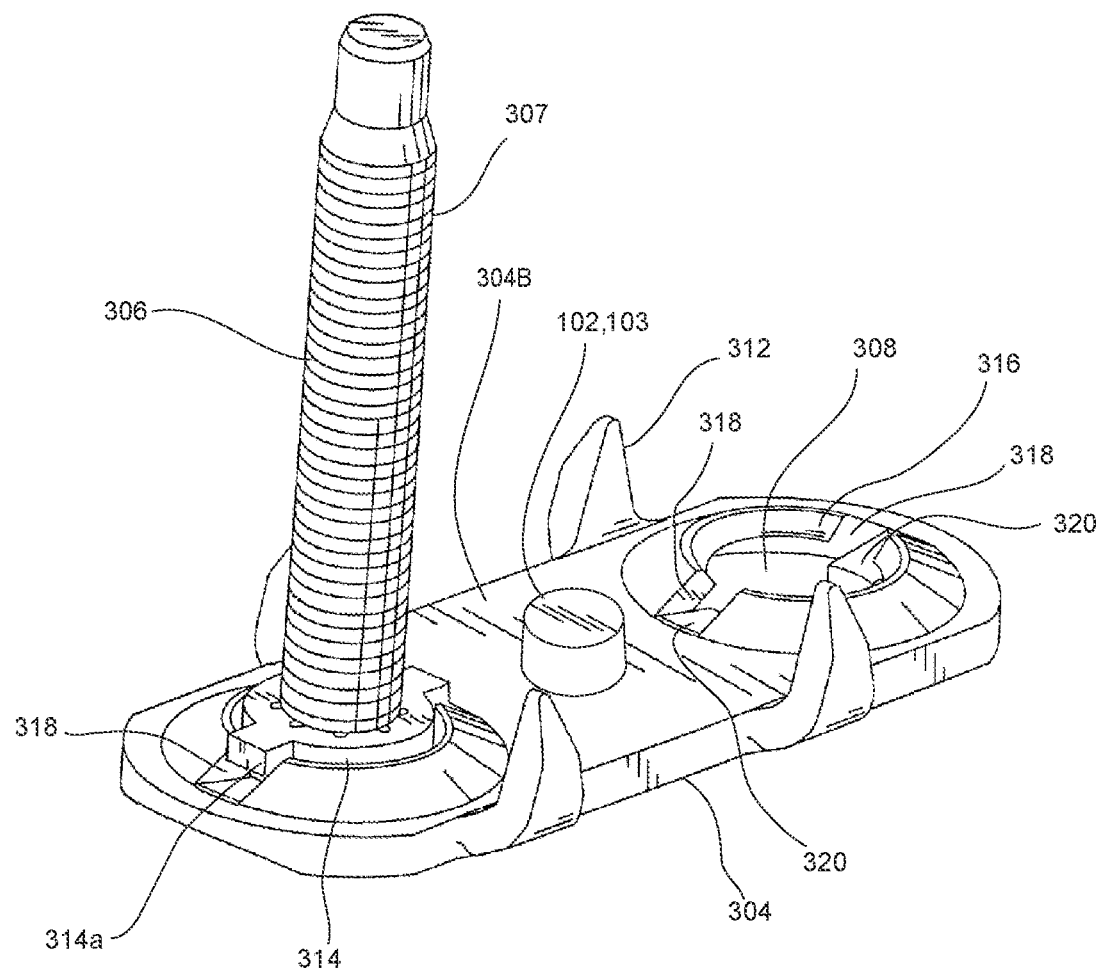
FIG. 6 is a perspective view of the lower plate of the plate fastener assembly of FIG. 5 with one of the bolts removed and a sensor module mounted to a central portion of the inner surface of the lower plate instead of the upper plate as shown in FIG. 5.

Examples of one particular form of the protective structure 200 is a bolt plate fastener assembly 300, shown in FIGS. 4-6. Bolt plate fastener assembly 300 may be the same type of bolt plate fastener assembly used to splice belt ends of the conveyor belt 12 together, wherein multiple side-by-side bolt plate fastener assemblies 300 extend across the width of the conveyor belt 12 to form splice 22, as shown in FIG. 1. Examples of such a bolt plate fastener assembly 300 are disclosed in U.S. Pat. No. 9,316,285, which is incorporated herein by reference in its entirety. In other forms, the splice 22 may be formed by different mechanical fasteners than the protective structure 200, e.g., bolt plate assembly 300 or a hinged fastener, such as the hinged fastener disclosed in U.S. Pat. No. 6,053,308. In another form, the splice 22 could be a seamless splice, such as disclosed in U.S. Patent Application Publication No. 2021/0276212, such that no mechanical fasteners are used to connect the ends of the conveyor belt.

The bolt plate fastener assembly 300 includes an upper plate 302, two bolts 306, two washers 314, and a lower plate 304. Each of the plates 302, 304 have a pair of recessed apertures 311, 308 for receiving a pair of bolts 306 extending through the lower plate member 304 and the upper plate member 302 and nuts 310 threaded down onto the projecting threaded ends of the bolt 306 to fasten the plates together with the belt 12 clamped between the plates 302 and 304. Each of the upper and lower plates 302, 304 may include a plurality of teeth 312 extending inwardly from a periphery of the plate member 302, 304 for biting into the material of the conveyor belt 12.

The bolt plate fastener assembly 300 includes an assembly or preassembly of bolts 306 and the lower plate 304. The assembly 12 is maintained in its preassembled condition by non-metallic or plastic washers 314 which are shown in FIGS. 4 and 6. The washers 314 are received with an interference fit on the shanks 307 of the bolts 306 to stay at a predetermined axial position therealong unless forcefully urged to shift on the shanks 307 so that the bolt shanks 307 will not pass back through recessed apertures 308 of the lower plate 304 through which the shanks 307 have been inserted.

Referring to FIGS. 5 and 6, the recessed apertures 308, 311 are defined by cups 316 that are each bent or deflected inwardly from generally flat, horizontally extending plate body of the upper and lower plates 302, 304 so that generally annular cup wall extends upward and inward at an incline toward the corresponding recessed aperture 308, 311 and obliquely relative to the plane in which the plate body 302, 304 generally extends. In the lower plate 304, the cups 316 are bent upwardly so that the apertures 308 are formed at the upper ends of the walls of the cups 316. The washers 314 are sized to be larger in diameter than the cup apertures 308, and specifically the uppermost edge of the cup walls that extend about the cup apertures 308 so as to be in interference therewith thereby keeping the bolts 306 and lower plate 304 in assembled relation. Also, the lower cups 316 and bolt heads 309 are provided with cooperating anti-rotation structure in the form of diametrically opposed notches 318 in the cup 316 so that the cup wall is formed by a pair of arcuate wall portions. This leaves radially inwardly extending tabs 320 of the lower plate 304 between the arcuate wall portions and below the cup wall notches 318 for being received in corresponding notches formed in the bolt head 309 so that when threading the nuts 310 on the shanks 301, the bolts 306 will not turn. In an alternative form, the washer 314 is provided with tabs 314A and the washer 314 is press fit onto the bolt shanks 307 so that the tabs 314A thereof are aligned with the notches 318 for fitting therein when the annular washer body is fit into the pocket of the recessed aperture 308. According to one alternative form shown in FIG. 6, the sensor module 102, which may include RFID chip 103, is coupled to an inner facing surface 304b of the lower plate member 304, such as via an adhesive. The sensor module 102 is located centrally between the apertures 308 and spaced from the periphery of the lower plate member 304.

Similar to the lower plate 304, the upper plate 302 has pair of recessed apertures 311 for receipt of the shank end portions of the bolt shanks 307 therethough. The apertures 311 are recessed in the same manner as the recessed apertures 308 of the lower plate 304. This allows the nuts 310 to be received in the cups 316 so as not to project above the upper surface 302A of the upper plate 302. As shown in FIG. 5, the sensor module 102, which may include RFID chip 103, is coupled to an inner facing surface 302b of the upper plate member 302, such as via an adhesive. The sensor module 102 is located centrally between the apertures 311 and spaced from the periphery of the upper plate member 302. During fastener installation, the lower plate 304 is first oriented to extend under the opening 24 formed in the belt to receive the sensor module 102. The bolts 306 are inserted through the through openings 26 previously formed in the belt 12 from the underside of the belt 12 until the bolt shanks 307 protrude through the outer surface of the belt 13A. The upper plate 302 is then oriented to extend over the opening 24 formed in the belt 12 and to receive the threaded shanks 307 of the bolts 206 through the recessed apertures 311 in the upper plate. Nuts 310 are threaded onto threaded end portions of the threaded shanks 307 to clamp upper plate 302 of the belt fastener assembly 300 onto the outer surface 13A of the conveyor belt 12. When the nuts 310 are tightened down on the threaded shanks 307, the belt 12 is clamped between the lower plate 304 and the upper plate 302, with the sensor module 102 positioned within the opening 24 formed in the belt, as shown in FIGS. 3A and 3B. The torque applied to the nuts 310 for this purpose is resisted by the anti-rotation tabs 320 received in the bolt head notches. In this manner, the bolts 306 will not turn as the nuts 310 are threaded onto the threaded shanks 307.

Figure 7:
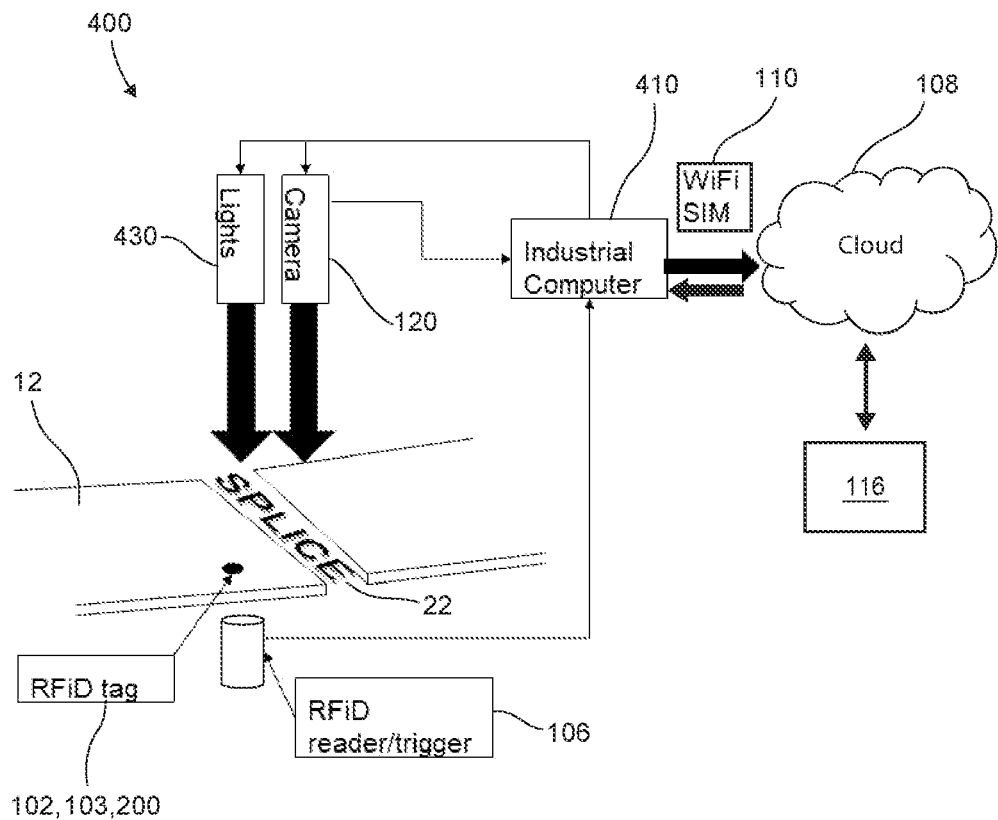
FIG. 7 shows a splice monitoring system including an RFID chip mounted to the conveyor belt adjacent to a splice of the conveyor belt, an RFID reader/trigger unit, a camera for acquiring images of the splice when the RFID tag is in range of the RFID reader/trigger unit, lights for illuminating the belt and splice, an industrial computer in communication with the splice monitoring system for acquiring and processing images from the camera and transferring images and related data to the cloud to allow further processing, storage, and remote user access thereto.

Splices 22 associated with a sensor module 102 including an RFID chip 103 may be inspected manually by an operator or automatically via a camera 420, such as a machine vision camera, of a splice monitoring system 400 as shown in FIG. 7, which may form a part of conveyor monitoring system 100. One or more lights 430 positioned adjacent the belt 12 for illuminating the area viewed by the camera 420 may be present. In one form, the camera 420, alone or in combination with a computer programmed to control and process imaging information from the camera 420, such as industrial computer 410, may be configured to automatically detect anomalies in the splice 22 by comparing the acquired image of the splice 22 to an expected image of the splice.

In another form, the camera 420 and optionally the lights 430, may be triggered by the RFID reader 106 via the computer 410 to illuminate and record an image of the splice 22 when the RFID chip 103 passes and is read by the RFID reader 106. In order to determine when the RFID chip 103 and/or splice 22 is appropriately positioned for the camera 420 to record one or more images of the splice 22, processing circuitry of the RFID reader 106 or of the associated computer 410 may determine the strength of the received signal from the RFID chip 103, such as via a Received Signal Strength Indicator (RSSI). The strength of the signal may be determined multiple times over a period of time as the RFID chip 103 attached to the conveyor belt 12 approaches and passes the RFID reader 106 and an average of the determined signal strengths can be determined. The processing circuitry of the RFID reader 106, or of the associated computer 410, can be configured to trigger the camera 420 at the appropriate time to capture an image of the splice 22, such as when the received signal strength, or an average of the received signal strengths, is highest. Alternatively, the camera 420 can be triggered when the received signal strength or the average of received signal strengths is at another predetermined value indicating that the RFID chip 103 is at its closest position relative to the RFID reader 106, or when the splice 22 is at a position suitable for the camera 420 to record an image of the splice 22. The camera 420 may capture one or more images or a video containing a plurality of images. The camera 420 or computer 410 may retain one or more images containing the splice 22 and discard the remaining images. Alternatively, the camera 420 may discard all images not containing the splice 22. The camera 420 or computer 410 may record the date and time at which each splice image is captured and store the splice image and its associated date and time together in a memory thereof. For example, the RFID reader 106 sends a signal to the computer 410 to indicate that the RFID chip 103 has been detected or is at the appropriate position to capture an image of the splice 22, and the computer 410 then sends a control signal to the camera 420 to capture one or more images, such as 3 to 5 images, or record a video for a predetermined period of time, such as 1 to 5 seconds.

The computer 410 may also be configured to control the camera 420 such that the camera 420 does not record or store an image of the splice 22 every single time the RFID chip 103 is read by the RFID reader 106, but instead records an image periodically, such as hourly, daily, weekly, monthly, or bi-monthly or based on a predetermined number of cycles that the RFID chip 103 is detected by the reader 106, such as every 10, 50, 100, or 500 times. The camera 420 may also be caused to capture one or more images by a user input to a remote computer 114 or mobile device, such as a smartphone 112, tablet computer, or laptop computer, of the system 100. The user input command to capture an image of the splice 22 may be relayed to the computer 410 via network 108.

In another form, the sensor module 104 may detect a potential fault condition associated with the splice 22, such as a damaged splice 22 impacting against a belt cleaner 14. For example, if an accelerometer of the sensor module 104 detects an acceleration greater than a predetermined threshold, the sensor module 104 may communicate the potential fault condition to the computer 410. The computer 410 then causes the camera 420 to capture one or more images of the splice 22, such as the next time, or a predetermined number of subsequent times, the RFID chip 103 associated with splice 22 is detected by the RFID reader 106.

The image of the splice 22 can then be associated with the digital twin of the splice 22 for access by a user to monitor the splice 22 over time. The image of the splice 22, as well as other information acquired from the camera 420 and/or RFID reader 106 may be acquired and processed by the computer 410 and further transmitted to the cloud computing system, such as control system 116 via a gateway 110 (FIG. 7), such as a Wi-Fi router or SIM card for connecting to a broadband cellular data network. The information acquired and processed by the computer 410 may be transmitted via network 108 to control system 116 computer 114, cloud computing system 117, another cloud computing system 118, or a handheld device such as smartphone 112, as shown in FIG. 8.

Instead of, or in addition to utilizing camera 420, a user may record an image of the splice 22 using a mobile computing device, such as a smartphone 112 or tablet, and associate and store the image with the stored record of the splice 22 in the cloud computing system, such as control system 116, via application software so that the condition of the splice 22 may be monitored and accessed at any time by a computer 114, tablet, or a smartphone 112 in communication with the monitoring system 100. The monitoring system 100 may prompt a user via an e-mail, SMS message, or application notification to inspect and/or upload a new image of a splice 22 based on various factors, such as a detected potential fault condition, a predetermined number of cycles, or a predetermined interval of time. The application software may include fields for providing comments and observations made by a user regarding the splice 22 for maintaining accurate historical data regarding the condition of the splice 22.

Figure 8:
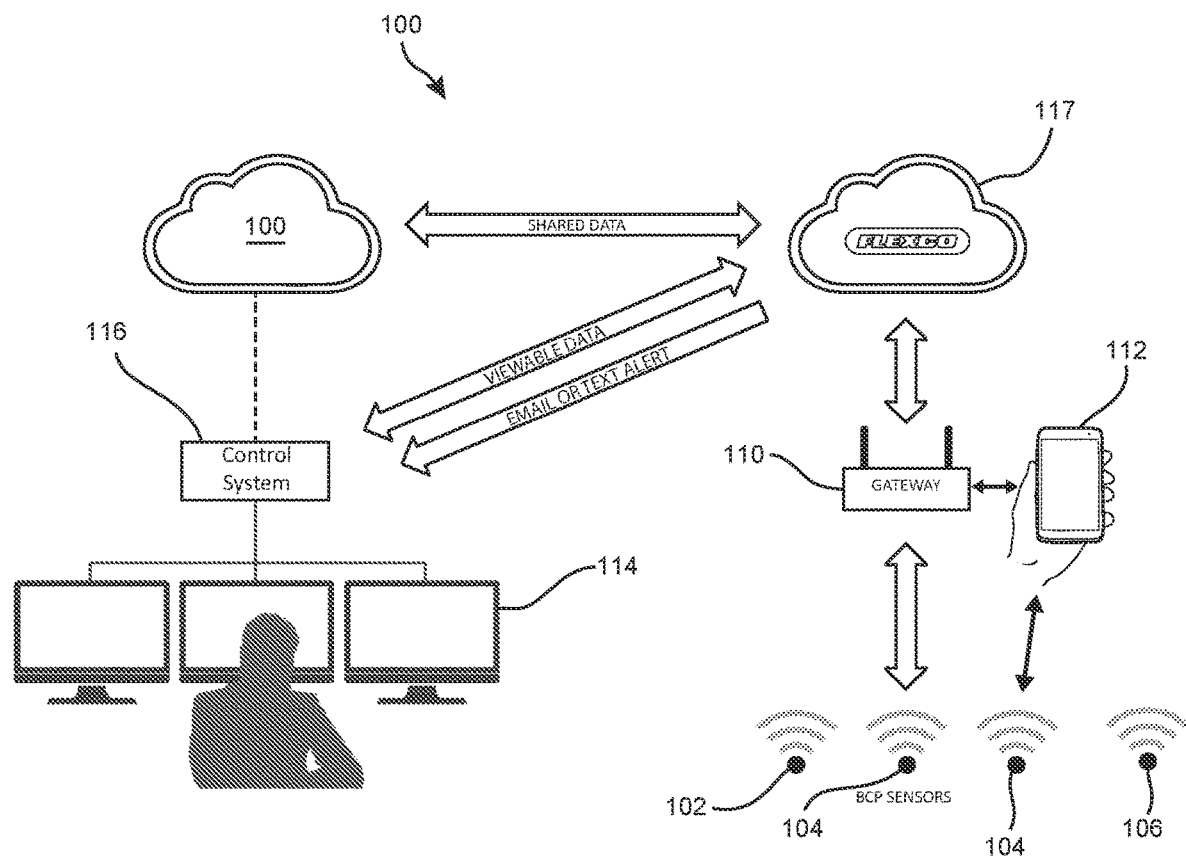
FIG. 8 is a network diagram illustrating the wireless communication of sensor modules of the splice monitoring system and conveyor monitoring system by way of a wireless gateway and cloud storage as well as a second cloud computing system for providing additional parameters to a control system.

As shown in FIG. 8, the conveyor system 10 includes a monitoring system 100 for monitoring one or more characteristics of one or more components of the conveyor system 10. The monitoring system 100 incudes sensor modules 102, 104, 106 positioned at one or more components of the conveyor system 10. The sensor modules 102, 104, 106 each include one or more sensors and a communication module, such as an antenna and associated circuitry in the case of an RFID chip 103, or one of the various communication modules described in more detail below. The sensor modules 102, 104, 106 are configured to detect one or more conditions of the one or more components based on, for example, movements or positions of components or portions thereof. In some forms, the sensor modules cooperate and communicate with one another to detect one or more conditions of one or more components of the conveyor system 10. The monitoring system 100 includes a remote resource, such as cloud computing system 117, that processes data from the sensor modules 102, 104, 106 to determine one or more characteristics of the corresponding ancillary devices and/or conveyor belt 12 and/or to predict the remaining lifespan thereof. The cloud computing system 117 is operable to detect other statuses of the conveyor system 10, such as whether the belt 12 is running, how long the belt 12 has been running, how many times a splice 22 has traveled about the conveyor system, whether the belt 12 is mistracking, whether the ancillary device is properly engaged with the belt 12, the amount of carryback, and the presence or absence of material on the belt 12. As is known, the cloud computing system 117 may include one or more remote servers providing cloud computing functionality.

The sensor modules 102, 104, 106 may communicate with the cloud computing system 117 by way of gateway 110. In some forms, a sensor module 102, such as RFID chip 103 associated with the conveyor belt 12, communicates with another sensor module 106, such as an RFID reader, which in turn may communicate with a third sensor module 104, or a smartphone 112 or computer 114, which then communicates with the gateway 110. Alternatively, the sensor modules 102, 104, 106 may be configured to communicate directly with a smartphone 112. The gateway 110 may be an internet router 110A or cellular tower 110B which connects the sensor modules 102, 104, 106 to the internet. Information from the cloud 117 is viewed by a user through a computer 114 or smartphone 112. The computer 114 is part of a control system 116, such as a computer configured to provide an operator information for monitoring, operating, adjusting or controlling the conveyor system 10 by the operator. Although a desktop computer 114 and a smartphone 112 are shown in FIG. 8, other computing devices may be utilized such as a laptop computer, a tablet computer, a smartwatch, and augmented reality glasses.

Figure 9A:
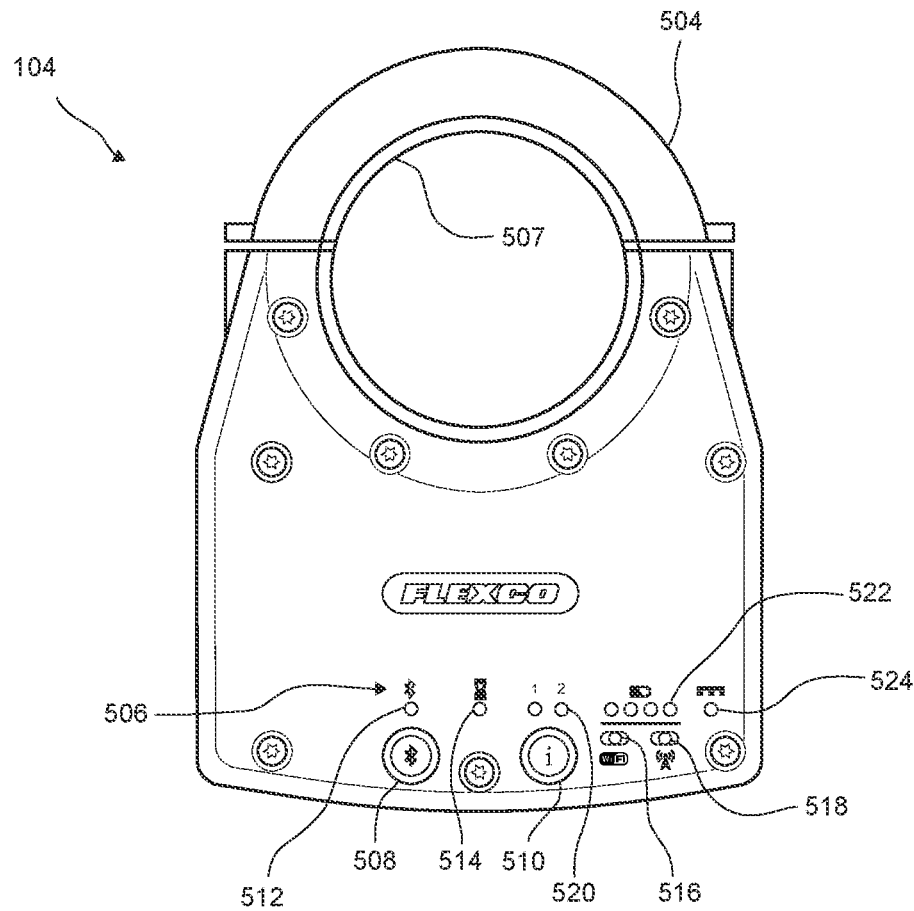
FIG. 9A is a front elevational view of a sensor module for being mounted to a support pole of a conveyor belt cleaner to monitor one or more ancillary devices.

In FIG. 9A, one embodiment of sensor module 104 is shown. The sensor module 104 is configured to detect one or more operating characteristics of an ancillary device of the conveyor system 10. The sensor module 104 has a housing 504 having separable portions to allow the housing 504 to be mounted about a support pole of belt cleaner 14 with the support pole extending through a through opening 507 formed by the housing 504. The separable portions of the housing 504 are coupled with screws to fix the separable portions together about the pole. The housing 504 includes a user interface 506 having a plurality of user inputs, such as Bluetooth® pairing button 508 for pairing the sensor module with a Bluetooth®-enabled device, such as smartphone 112, and status input button 510, which causes status indicators, such as pairing indicator 512, connection indicator 514, WiFi indicator 516, cellular indicator 518, status indicators 520, battery life indicator 522, and/or wired power source indicator 524 to illuminate.

Figure 9B:
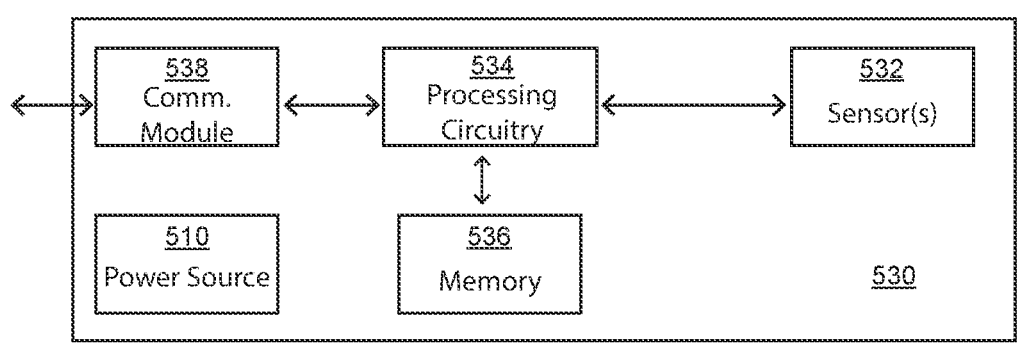
FIG. 9B is a block diagram of a sensor circuit of the sensor module of FIG. 9A.

The housing 504 of sensor module 104 encloses a sensor circuit 530 schematically illustrated in FIG. 9B. The sensor circuit 530 may include one or more sensors 532, such as an accelerometer, gyroscope, and magnetometer, which may be used to detect movement of an ancillary device. Processing circuitry 534 includes a processor communicatively coupled to the sensors 532, a memory module 536, and a communication module 538, such as one of the communication modules described in more detail below. The memory module 536 is a non-transitory computer readable memory, such as random access memory (RAM), solid state memory, or magnetic disc-based memory. Data from the sensors 532 is transmitted to the processing circuitry 534, which writes the received data to the memory module 536. The processing circuitry 534 also may operate the communication module 538 to wirelessly transmit data from the sensors 532 to an external device using one or more of the standards listed below. The communication module 538 may also receive data from other devices, such as sensor modules 102 and 106, and send the data to other devices, such as a remote computing device 112, 114, 116, 117, 118. A power source 540, such as a direct wired connection or a battery, powers the processing circuitry 534, memory module 536, communication module 538, and sensors 532.

Regarding FIG. 2, the conveyor system 10 further may include a gateway or communication hub 110, such as a wireless router 110B, which wirelessly communicates with the plurality of sensor modules 102, 104, 106. The wireless communication between the sensor modules 102, 104, 106 and gateway 110 may utilize any of a variety of communication protocols. For example, the sensor modules 102, 104, 106 may use infrastructure protocols such as 6LowPAN, IPv4/Ipv6, RPL, QUIC, Aeron, uIP, DTLS, ROLL/RPL, NanoIP, CNN, and TSMP; identification protocols such as EPC, uCode, Ipv6, and URIs; communication/transport protocols such as Wifi, Bluetooth®, DigiMesh, ANT, NFC, WirelessHart, IEEE 802.15.4, Zigbee, EnOcean, WiMax, and LPWAN; discovery protocols such as Physical Web, mDNS, HyperCat, UpnP, and DNS-SD; Data protocols such as MQTT, MQTT-SN, Mosquitto, IMB MessageSight, STOMP, XMPP, XMPP-IoT, CoAP, AMQP, Websocket and Node; device management protocols such as TR-069 and OMA-DM; semantic JSON-LD and Web Thing Model; and/or multi-layer frame work protocols such as Alljoyn, IoTivity, Weave, and Homekit.

The monitoring system 100 may include a processor and the measured data from one or more of the sensor modules 102, 104, 106 and corresponding to a detected one or more characteristics is received by the processor. The processor or another remote processor or processors, such as in the cloud 117, may identify fault conditions, such as a mistracking belt or a worn out or broken ancillary device, in the conveyor system 10 based on the measured data. In one form, the processor that receives the measured data is a local processor directly connected to a sensor module, and the processor that identifies fault conditions or worn-out devices is part of a remote computing device 112, 114, 116, 117, 118. The remote processor can be part of a remote computing device 112, 114, 116, 117, 118 that receives the data from one or more sensor modules 102, 104, 106 over a wired and/or wireless communication network. In some forms, each sensor module communicates directly with a communication hub or gateway 110, such as a router 110B. In another form, the sensor modules form a mesh network, in which a first sensor module acts as a communication relay for a second sensor module, the second sensor module acts as a communication relay for a third sensor module, and so on. The ability of the sensor modules to operate as communication relays allows sensor modules that would have difficulty directly communicating with a communication hub of the system to still provide data to the processor. For example, the communication hub may be positioned at the beginning of an underground mine. The first sensor module is closest to the communication hub while the second and third sensor modules are progressively farther into the mine. Although the second and third sensor modules may be unable to communicate directly with the communication hub due to interference from the rock of the mine, data from the third sensor module may be relayed by the second sensor module to the first sensor module which in turn relays the information to the communication hub. Likewise, the data from the second sensor module may be relayed by the first sensor module to the communication hub. In other forms, one or more of the sensor modules include a cellular communication card, such as a Global System for Mobile Communications ("GSM") card and communicate via a cellular network.

In some forms, the gateway 110A, 110B communicates with an external data processing system, such as a cloud-based computing system, such as control system 116 as shown in FIG. 2. The cloud-based computing system may store communicated data and/or process the communicated data and relay data back to the gateway 110A, 110B or another computer system for further processing or storage. For example, the cloud-based computing system may include one or more data processing applications configured to run on a virtual machine in the cloud-based computing system and process the data communicated to the cloud-based computing system by the gateway 110. Alternatively or additionally, the gateway 110 transmits data from the sensor modules 102, 104, 106 to one or more onsite computers such as a control room computer or portable computers, e.g., smartphones or tablets, carried by users of the conveyor system 10. The sensor modules 102, 104, 106 may also transmit data directly to the one or more onsite computers using one or more communication protocols such as those listed above. Furthermore, the sensor modules 102, 104, 106 may transmit data between each other or other sensors before communicating data to the one or more on-site computers, the gateway 110, and/or the cloud-based computing system. The gateway 110 may use the same protocols or different protocols when communicating with the cloud-based computing system, an on-site computer, or another external device.

In another form, FIG. 2 illustrates the conveyor system 10 in which one or more of the sensor modules 102, 104, 106 include communication modules, which may be cellular communication modules. The communication modules are configured to communicate over a standard cellular communication protocol, such as GSM. One or more of the sensor modules 102, 104, 106 can communicate with the control system 116 over a network 108 by way of a cellular phone tower 110A. In some forms, the communication module is configured to communicate over a low-power wide-area network, such as LTE CAT-M1 or NB-IoT. The communication module includes a fallback communication protocol, such as 2G cellular communications.

The sensor modules 102, 104, 106 may be configured to sense data continuously but only transmit a portion of the data in order to reduce the amount of data that needs to be processed. For example, if the sensor module 102 includes an active RFID chip or other sensor or communication circuitry that requires a power source, the sensor module 102 may be programmed to sample the sensed data at predetermined intervals, such as every second, every minute, every hour, or every day and transmit the sampled data to the cloud-based computing system for processing. Sampling data at a fixed interval allows system users to control their data costs. However, at times, additional samples may be utilized to confirm a fault condition, such as a mistracking belt. In this case, the cloud-based computing system, such as control system 116, may temporarily increase the sampling rate of a particular sensor module in order to confirm a fault condition exists. Generally, the sampling rate of the sensor modules may be increased or decreased as desired for particular situations.

Sensor module 102 may include a wide variety of devices instead of, or in combination with an RFID chip 103, including alternate tracking or positioning systems, communication modules such as Bluetooth®, Bluetooth® Low Energy (BLE), WiFi, cellular, and Ultra-Wide-Band (UWB), and sensor or sensor modules, such as infrared, lidar, ultrasonic, visual and laser.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. An apparatus for attaching a sensor to a conveyor belt, comprising:
    an upper plate member configured to engage an outer surface of a conveyor belt, the upper plate member having an inner belt facing surface;
    a lower plate member configured to engage an inner surface of the conveyor belt and to be connected to the upper plate member, the lower plate member having an inner belt facing surface; and
    a sensor secured directly to one of the inner belt facing surfaces of the upper and lower plate members such that it is positioned between the upper and lower plate members when the upper and lower plate members are connected to one another with the conveyor belt therebetween so that the sensor is protected from impacts by at least one of the upper and lower plate members.

2. The apparatus of claim 1, wherein the upper and lower plate members each include a pair of spaced-apart apertures for being aligned to receive a pair of fasteners therethrough for connecting the upper and lower plate members to one another and to the conveyor belt with the conveyor belt clamped between the upper and lower plate members.

3. The apparatus of claim 2, wherein the upper and lower plate members when joined together with fasteners form part of a bolt plate fastener that is configured for forming a splice that joins two ends of the conveyor belt together.

4. The apparatus of claim 3, wherein the splice comprises a plurality of the bolt plate fasteners and the bolt plate fastener including the sensor is spaced upstream or downstream from the splice and adjacent thereto.

5. The apparatus of claim 2, wherein the sensor is mounted between the pair of spaced-apart apertures of one of the upper and lower plate members.

6. The apparatus of claim 5, wherein the upper and lower plate members each have a generally flat horizontally extending plate body and each of the pair of spaced-apart apertures of the upper and lower plate members are defined by an annular cup portion that extends inwardly from the respective generally flat horizontally extending plate body such that each of the pair of spaced-apart apertures of the upper plate member are positioned below the inner facing surface of the upper plate member and each of the pair of spaced-apart apertures of the lower plate member are positioned above the inner facing surface of the lower plate member such that the sensor is mounted between a pair of the annular cup portions of one of the upper and lower plate members.

7. The apparatus of claim 1, wherein each of the upper and lower plate members comprises a plurality of teeth extending inwardly from a periphery of the respective plate member configured for biting into the conveyor belt.

8. The apparatus of claim 1, wherein the sensor is mounted at least partially within a recess formed in the inner belt facing surface of the upper or lower plate member to which the sensor is connected.

9. The apparatus of claim 1, wherein the sensor comprises an RFID chip.

10. The apparatus of claim 1, wherein the sensor is attached to the inner belt facing surface with an adhesive.

11. A method for affixing a sensor to a conveyor belt, comprising:
forming an opening in at least one surface of opposite surfaces of a conveyor belt sized and configured to receive at least a portion of a sensor therein;
engaging first and second plate members with the opposite surfaces of the conveyor belt with the opening therebetween, the sensor being secured directly to an inner belt facing surface of one of the first and second plate members;
positioning at least a portion of the sensor within the opening so that at least one of the first and second plate members encloses the sensor within an enclosed pocket; and
fastening the first and second plate members to one another and to the conveyor belt.

12. The method of claim 11, wherein the opening is formed at an upstream or downstream position adjacent to a splice in the conveyor belt such that the opening is closer to the splice than to any other splices present in the conveyor belt.

13. The method of claim 11, wherein the opening is a through opening that extends through and forms openings in the opposite surfaces of the conveyor belt so that the first and second plate members extend over and cover the openings to form the enclosed pocket.

14. The method of claim 11, further comprising forming a first through opening in the conveyor belt adjacent to the opening configured for receiving a shank of a first bolt; and
forming a second through opening in the conveyor belt adjacent to the opening on a side opposite from the first through opening configured for receiving a shank of a second bolt;
wherein fastening the first and second plate members to one another and to the conveyor belt comprises inserting the shanks of the first and second bolts through the first and second through openings in the conveyor belt and through corresponding apertures in one of the first and second plate members and threading nuts onto ends of the shanks to clamp the conveyor belt between the first and second plate members.

15. The method of claim 11, wherein the sensor comprises an RFID chip.

16. The method of claim 11, wherein positioning at least a portion of the sensor within the opening so that at least one of the first and second plate members encloses the sensor within an enclosed pocket comprises engaging one of the first and second plate members having the sensor attached to an inner belt-facing surface thereof with the at least one surface of the conveyor belt with the at least a portion of the sensor positioned in the opening and the one of the first and second plate members covering the opening.

17. A monitoring system for monitoring a conveyor belt comprising:
a sensor positioned within an enclosed pocket, the enclosed pocket formed by an opening in at least one of opposite surfaces of the conveyor belt and at least one of a first plate member and a second plate member that encloses the sensor within the enclosed pocket and that has an inner belt facing surface to which the sensor is directly secured, wherein the first and second plate members are fastened to one another with the conveyor belt clamped therebetween;
a sensor module positioned adjacent the conveyor belt configured for receiving a signal from the sensor to detect a presence of the sensor when the sensor comes into proximity with the sensor module; and
communication circuitry operably connected with the sensor module configured to transmit data associated with the detection of the sensor for processing.

18. The monitoring system of claim 17, wherein the sensor comprises an RFID chip and the sensor module comprises an RFID reader.

19. The monitoring system of claim 18, further comprising processing circuitry associated with the sensor module configured to determine when the RFID chip is closest to the RFID reader.

20. The monitoring system of claim 17, wherein the communication circuitry is configured to communicate with a communication hub via a cellular communication protocol.

21. The monitoring system of claim 17, further comprising a control system remote from the sensor module configured to receive and store data associated with the detection of the sensor via a communication hub.

22. The monitoring system of claim 17, further comprising a camera positioned adjacent to the conveyor belt and operably connected with the sensor module;
wherein processing circuitry operably connected with the sensor module is configured to cause the camera to capture an image of a splice in the conveyor belt associated with the sensor as a result of the sensor module detecting the presence of the sensor.

23. The monitoring system of claim 17, wherein the sensor and fastened together first and second plate members comprise a first sensor module, the sensor module that receives a signal from the sensor comprises a second sensor module, and further comprising a third sensor module having a housing mounted to an elongate support of a conveyor belt cleaner, the third sensor module including communication circuitry configured to wirelessly communicate with the second sensor module to receive data associated with the detection of the sensor.

24. A monitoring system for monitoring a conveyor belt comprising:
a sensor positioned within an enclosed pocket, the enclosed pocket formed by an opening in at least one of opposite surfaces of the conveyor belt and at least one of a first plate member and a second plate member that encloses the sensor within the enclosed pocket, wherein the first and second plate members are fastened to one another with the conveyor belt clamped therebetween;
a sensor module positioned adjacent the conveyor belt configured for receiving a signal from the sensor to detect a presence of the sensor when the sensor comes into proximity with the sensor module;
communication circuitry operably connected with the sensor module configured to transmit data associated with the detection of the sensor for processing; and a control system remote from the sensor module configured to receive and store data associated with the detection of the sensor via a communication hub, wherein the control system is configured to maintain a digital twin of a portion of the conveyor belt associated with the sensor.

25. The monitoring system of claim 24, wherein the portion of the conveyor belt with which the sensor is associated comprises a splice in the conveyor belt and the digital twin maintained by the control system is a digital twin representative of the splice; wherein the control system is configured to record instances that the sensor module detects the presence of the sensor and associate said instances with the digital twin of the splice.

26. The monitoring system of claim 25, wherein the control system is configured to associate an image of the splice with a digital twin of the splice.

27. The monitoring system of claim 25, wherein the control system is configured to predict when the splice requires replacement or repair based on at least a number of times the sensor has traveled by the sensor module.

28. The monitoring system of claim 25, wherein the digital twin comprises at least one of a serial number of the sensor, a splice fastener type used in the splice, a number of cycles of the splice, an installation date of the splice, an age of the splice, an installation date of the sensor, an age of the sensor, an image of the splice, an inspection, repair or replacement date, and a recommended inspection, repair or replacement date.

29. The monitoring system of claim 24, wherein the control system is configured to associate information transmitted to the control system from a mobile device with the digital twin.

* * * * *